Patented July 22, 1924.

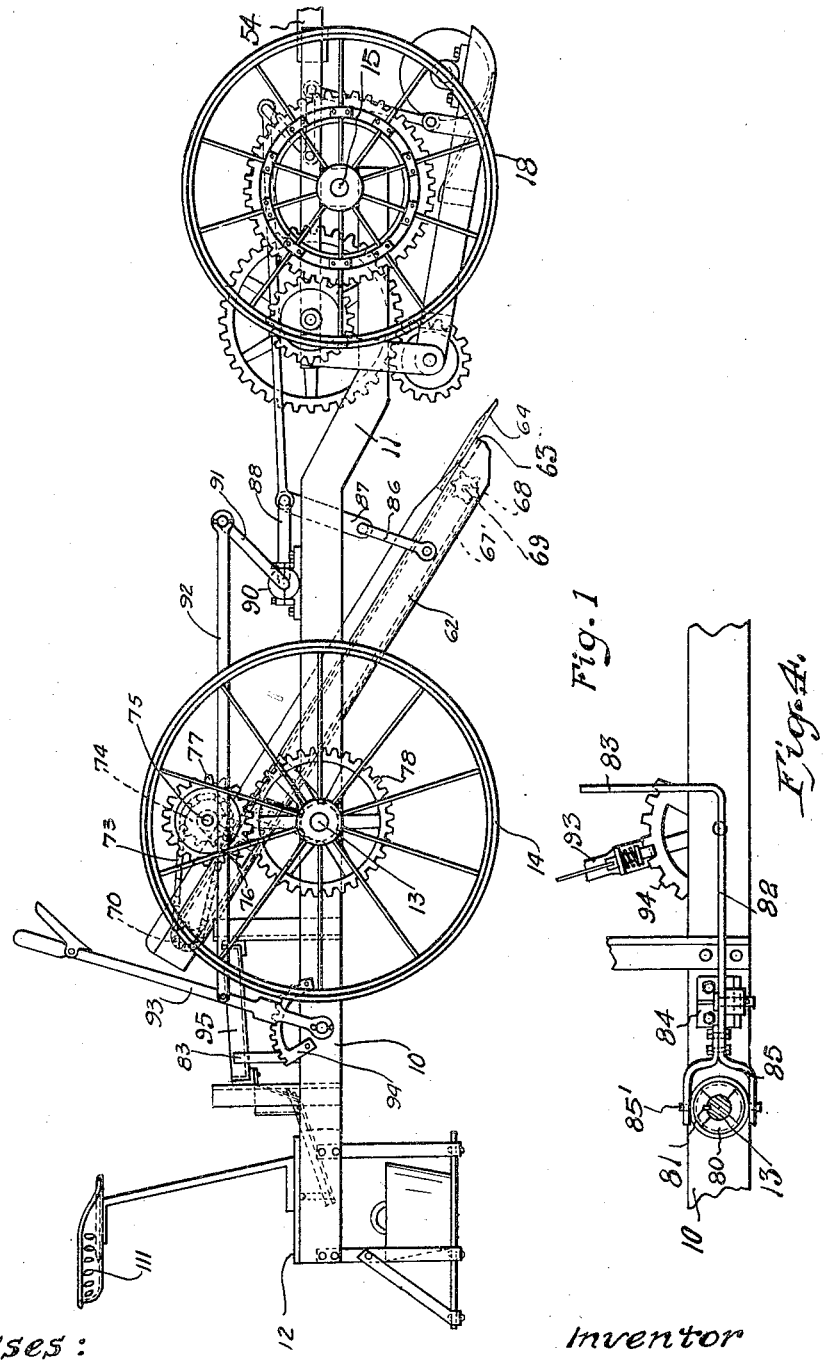

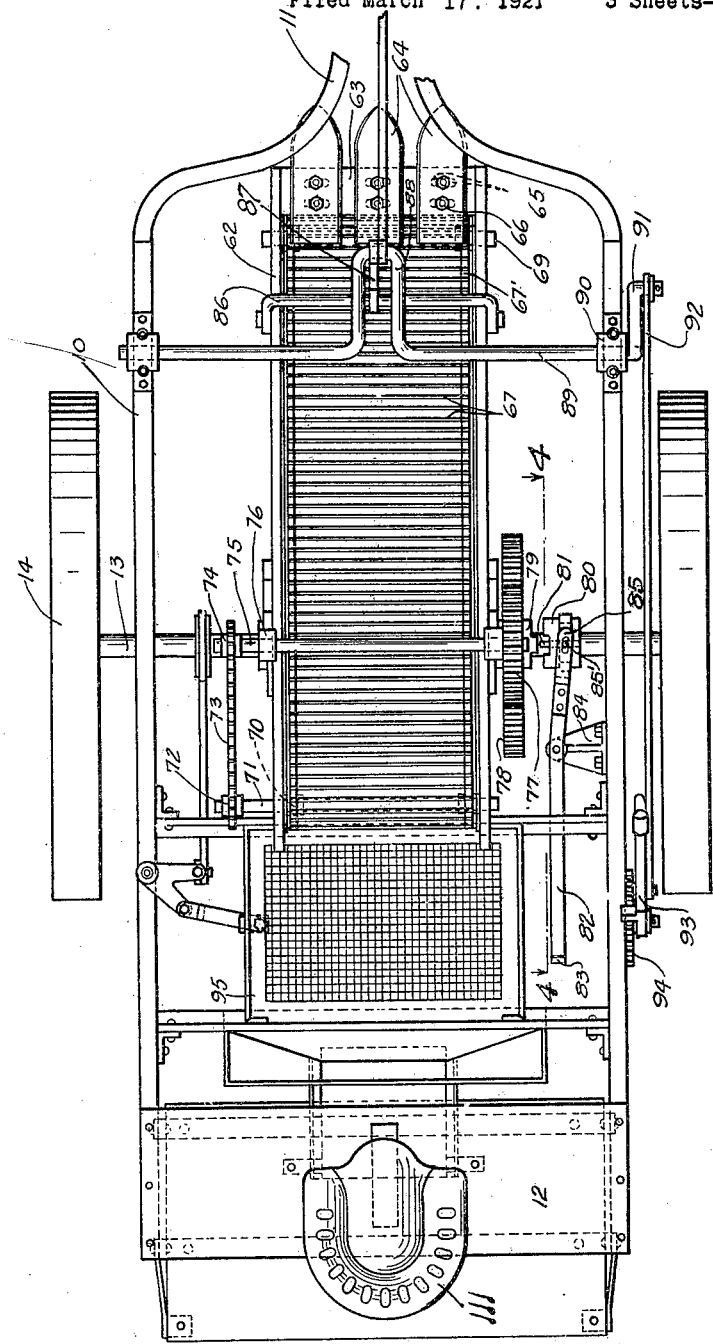

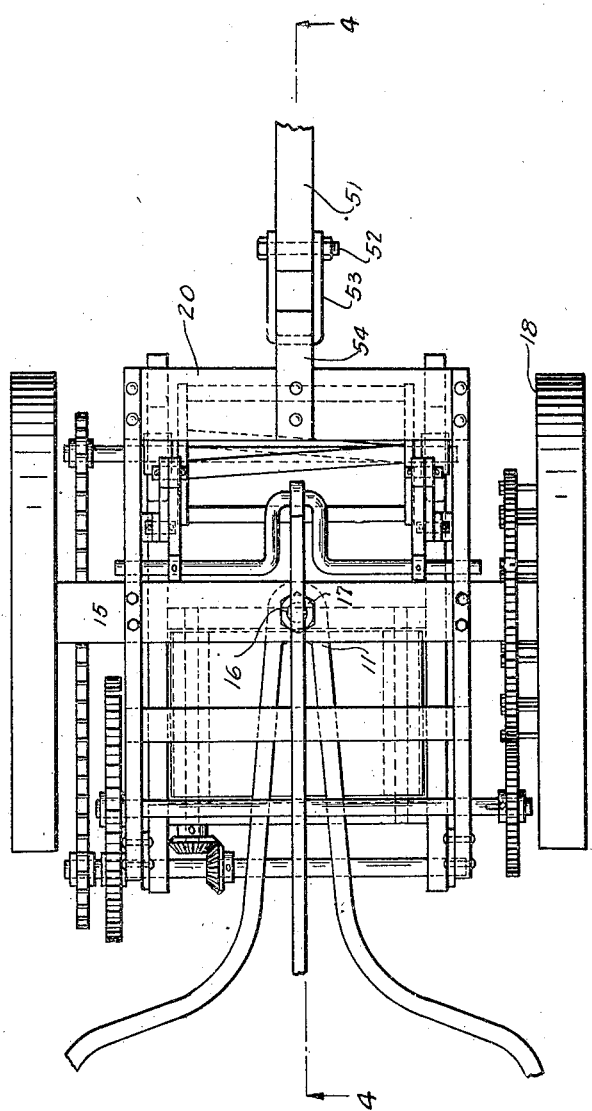

1,502,522

UNITED STATES PATENT OFFICE.

HENRY C. NIEMEYER, OF CHICAGO, ILLINOIS.

VEGETABLE HARVESTER.

Application filed March 17, 1921. Serial No. 453,046.

*To all whom it may concern:*

Be it known that I, HENRY C. NIEMEYER, a citizen of the United States, and a resident of the city of Chicago, county of Cook, and State of Illinois, have invented certain new and useful Improvements in Vegetable Harvesters, of which the following is a specification.

My invention relates to a new and improved vegetable harvester and more particularly to an onion harvester, which has for its object the provision of a machine which will dig up the vegetables from the ground, elevate them and remove the dirt therefrom, and deposit the same in a receptacle clean and ready for the market or for use.

The subject matter pertaining to the foliage clipping mechanism is covered by claims contained in the divisional case, filed November 21, 1921, Serial No. 516,686.

Other objects will appear hereinafter.

The invention consists in the combinations and arrangements of parts hereinafter described and claimed.

The invention will be best understood by reference to the accompanying drawings forming a part of this specification, and in which, Fig. 1 is a side view of the machine;

Fig. 2 is a plan view of the rear half or the harvest part of the machine;

Fig. 3 is a plan view of the front half of the machine; and

Fig. 4 is a sectional view taken on line 4—4 of Fig. 2.

The invention illustrated comprises a frame 10 which has its front end 11 formed by bending a bar back upon itself at the middle portion then bending it upward and rearward, and which has its rear end connected by a cross plate 12. The frame is mainly supported on an axle 13 which rotates in the frame and with attached wheels 14. The front end 11 of the frame is pivotally supported on an axle 15 (see Fig. 3) by means of a bolt or king pin 16 held in position by a pair of nuts 17, and said axle is supported by the front wheels 18 rotatably mounted thereon.

A beam or tongue 51 is provided by means of which the machine may be drawn and guided. This tongue is mounted on the front cross bar 20 in any convenient manner, as by a bolt 52, yoke 53 and stub beam 54, which allow vertical movement to said tongue.

The digging and elevating mechanism includes a conveyor frame 62 which is pivotally mounted on the rear axle 13 and carries on its front bar 63 a plurality of shovels or plows 64, which are adjustably mounted on said bar by means of a plurality of holes 65 provided in the bar and by bolts 66 engaging therein and in the plows. These plows are narrow in front and are concave as indicated in Fig. 1 so as to convey the onions and vegetables onto the endless chain conveyor, of the usual well known construction, having carrier rods 67 and the chains 67' of which run on the sprockets 68 mounted on a shaft 69 in the lower end of the frame 62 and on the sprockets 70 fastened on shaft 71 which is mounted in the upper end of said frame. A driving sprocket 72 is fastened to one end of said shaft and engages a driving chain 73 which embraces a sprocket 74 fixed to one end of a shaft 75 mounted in brackets 76 which extend above the frame 62. On the other end of said shaft 75 is fastened a gear 77 which meshes with a larger gear 78 rotatable on the axle 13. The side of the gear 78 is provided with a clutch 79 which is engageable by a clutch member 80 slidably mounted on axle 13 but forced to rotate therewith owing to the spline 81 on the axle. A lever 82 having an engaging arm 83 is pivoted to a bracket 84 on the frame 10 and is provided with a fork 85 with slots therein which engage pins 85' extending from the clutch member 80. A rod 86 is attached to the front part of frame 62 and is engaged by a link 87 the upper end of which engages the bight of a yoke 88 formed at the middle portion of a crank rod 89, the free end of control rod 60 being also connected to the bight of this yoke 88. Said crank rod is journaled in brackets 90 on frame 10 and has its crank arm 91 engaged by a link 92 which is pivoted to the operating lever 93 the lower end of which is fulcrumed in frame 10. Said lever is provided with the usual operating means and pawl to co-act with the rack 94 attached to the frame 10.

The conveyor delivers the onions or vegetables on to the cleaner or shaker 95. A seat 111 for the driver or operator is mounted on the plate 12.

In operation the necessary draft animals are hitched to the tongue or beam 51 to propel and guide the harvester and the driver positioned upon the seat 111 throws forward the lever 93 thereby lowering the conveyor frame 62 and attached plows. The plows 64 will thereafter dig up the onions or vegetables which with the surrounding dirt are crowded rearwards upon the conveyor and thereby elevated and discharged on the shaker 96. The dirt is partly removed through the rods 67 of the conveyor and fully removed by the shaker 95, wherefrom they descend through the chute 104 along the conduit 105 and into the receptacle 110 placed on the platform 107 for this purpose. This platform is of sufficient size to enable a person to stand thereon and place the onions or vegetables from the receptacle 110 into a sack or suitable receiver, which may then be tied up when full and dropped to the ground. Two baskets may be used, one standing under the chute receiving the vegetables while the other is being emptied into the sack or receiver. A number of empty sacks may be carried on the platform or on the plate 12. Instead of the basket 110 a sack may be held directly under the chute or fastened thereunder in any convenient manner.

When it is desired to set the device out of gear it is merely necessary to throw the lever 83 inwards toward the shaker with the hand or foot, and to draw the lever 93 rearward.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A vegetable harvester of the class described comprising a front and a rear axle, a main frame supported thereon, a frame pivotally mounted within said main frame adjacent the rear axle, a plurality of shovels for digging a plurality of consecutive rows, mounted for lateral adjustment on said pivoted frame, and elevating means in said pivoted frame to convey said vegetables.

2. A harvester of the class described comprising a rear axle, a conveyor frame mounted thereon, an endless conveyor mounted in said frame, a plurality of plows mounted at the front end of said frame, and means for adjustably mounting said plows to dig a separate row of vegetables with each plow.

3. A harvester of the class described comprising a rear axle, a conveyor frame provided with a front bar mounted on said axle, a plurality of plows on said bar, means for adjustably mounting said plows on said bar to dig adjacent rows of vegetables therewith, one row with each plow, and one conveyor to receive and carry said vegetables from said plows.

4. An onion harvester of the class described, comprising a conveyor frame mounted between the rear wheels of said harvester and provided with side members and a front bar, a plurality of plows mounted on said front bar and laterally adjustable thereon, and a conveyor having endless chains and cross rods thereon mounted between said members and extending beneath said front bar, said rods being spaced apart to retain the onions thereon but permit earth to pass therebetween.

5. An onion harvester of the class described, comprising a rear axle, a conveyor frame provided with a front bar mounted on said axle, a plurality of plows on said bar, means for adjustably mounting said plows on said bar to dig a separate row of vegetables with each plow, and a conveyor in said frame to receive and carry the vegetables from all of said plows, said conveyor comprising an endless chain and rods spaced to retain onions thereon and permit earth to pass therebetween.

In testimony whereof I have signed my name to this specification in the presence of two subscribing witnesses.

HENRY NIEMEYER.

Witnesses:
FREDA C. APPLETON,
CLARENCE E. THREEDY.